Figure 1:
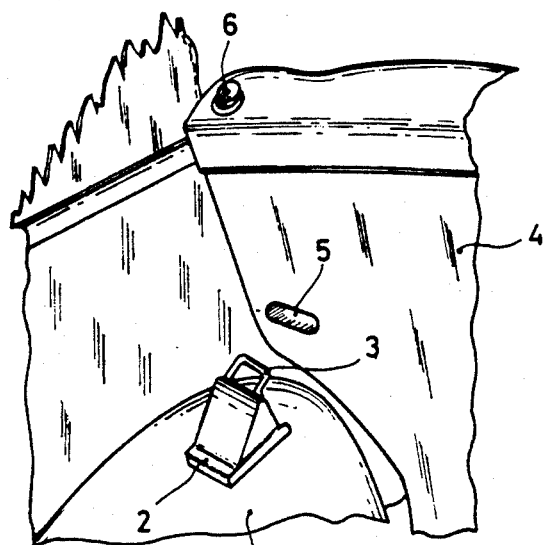

United States Patent [19]

Hassmann

[11] Patent Number: 4,866,820
[45] Date of Patent: Sep. 19, 1989

[54] CLAMPING FIXTURE WITH AN APPROXIMATELY U-SHAPED SHACKLE IN A MOTOR VEHICLE

[75] Inventor: Franz Hassmann, Grob-Bieberau, Fed. Rep. of Germany

[73] Assignee: General Motors Corporation, Detroit, Mich.

[21] Appl. No.: 144,305

[22] Filed: Jan. 14, 1988

[30] Foreign Application Priority Data

Jan. 30, 1987 [DE] Fed. Rep. of Germany ....... 3702767

[51] Int. Cl.$^4$ ............................................. B60N 1/02
[52] U.S. Cl. ..................... 24/628; 296/65.1; 296/69; 248/503.1
[58] Field of Search ............... 24/628, 682, 572, 292, 24/293; 296/65.1, 69; 297/379, DIG. 2; 248/503.1

[56] References Cited

U.S. PATENT DOCUMENTS

| | | | |
|---|---|---|---|
| 2,322,656 | 6/1943 | Murphy | 24/293 |
| 3,520,031 | 7/1970 | Nelson | 24/292 |
| 4,475,763 | 10/1984 | Hamataini et al. | 296/69 |
| 4,636,005 | 1/1987 | Bolz et al. | 296/65.1 |
| 4,657,297 | 4/1987 | Ishibashi | 296/65.1 |
| 4,671,570 | 6/1987 | Hockenberry et al. | 297/DIG. 2 |
| 4,742,984 | 5/1988 | Cote et al. | 248/503.1 |

FOREIGN PATENT DOCUMENTS 3140002 4/1983 Fed. Rep. of Germany .

OTHER PUBLICATIONS

U.S. Published Patent Application No. 3,386,403 to Geier, Jan. 28, 1975.

*Primary Examiner*—Victor N. Sakran
*Attorney, Agent, or Firm*—Ernest E. Helms

[57] ABSTRACT

A clamping fixture (2) for a shackle (3) of a rear seat backrest (4) has a tongue (11) projecting from the plane of a holding surface (9), behind which the shackle (3) is pushed. The tongue (11) has an aperture (23) into which a stopper (12), which secures the shackle (3) against coming out of the tongue (11) in the upward direction, is inserted.

9 Claims, 3 Drawing Sheets

U.S. Patent  Sep. 19, 1989  Sheet 1 of 3  4,866,820

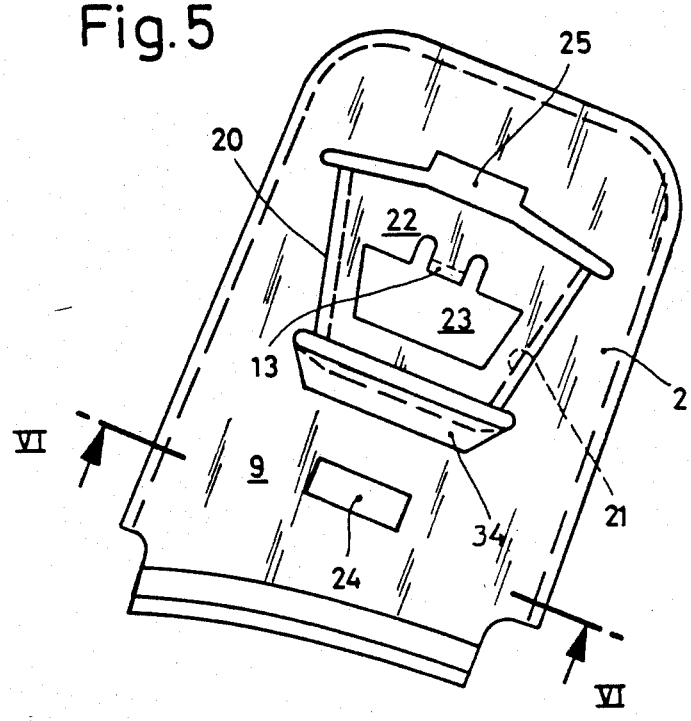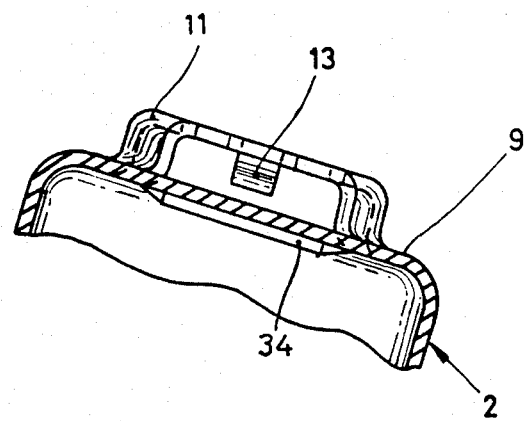

CLAMPING FIXTURE WITH AN APPROXIMATELY U-SHAPED SHACKLE IN A MOTOR VEHICLE

The present invention pertains to a clamping fixture with an approximately U-shaped shackle in a motor vehicle, in which the shackle is bent at right angles in the plane of the U and its free arms are held by the clamping fixture. Such a clamping fixture is described in DE-PS No. 31 40 002.

Adjustable rear seat backrests in motor vehicles must be attached to a body part to prevent them from folding down in the forward direction during braking. This is usually achieved by means of shackles which are attached to a clamping fixture on each wheel case. With the rear seat backrest in the upright position, locking members, which can be released by hand, grip in the rear seat backrest via these shackles. According to the said DE-PS No. 31 40 002, the shackles are screwed to the corresponding pillow block by means of a tongue reaching over them and by screws passing through them.

The assembly of the shackles is rather time-consuming because of the screwing. This leads to an overall considerable cost factor, especially since the costs of the screw connection are also to be taken into account.

The basic task of the present invention is to design a clamping fixture of the type described in the introduction in that it can be mounted rapidly and in a simple manner.

This task is accomplished according to the present invention in that the clamping fixture has a tongue stamped out of a holding surface, behind which the shackle is disposed, simultaneously abutting against the holding surface above and below the tongue, and that in its front wall, the tongue has an aperture in which is seated a stopper which locks the shackle in the tongue.

Due to this design according to the present invention, the shackles can be completed fastened to the holding surface and thus to a body part without screws. Mounting can thus be performed very rapidly and without tools. Aside from the fact that mounting costs are saved, material costs are saved and a weight reduction is achieved.

According to an advantageous embodiment of the present invention, the free arms of the shackle converge toward each other, the tongue becomes narrower in the downward direction, and the stopper laterally abuts against the converging arms. The converging arms cause the shackle to be pulled downward by the stopper abutting against it on the inside into the tongue, as a result of which it is held in it reliably, firmly and without rattle.

A stopper of trapezoidal cross section made from a resilient plastic also contributes to the good seating of the shackle.

In the upward direction, the stopper abuts against a contact surface that can be of sufficient size if the aperture is bound at the top by an offset portion of the tongue, which offset portion is directed into the aperture perpendicular to the plane of the aperture. The shackle is thus prevented from being torn out in the upward direction in a simple manner.

The stopper is held in its end position in a positive-locking manner, without requiring special fastening means requiring the use of a tool if, according to another embodiment of the present invention, the stopper is snapped in the holding surface carrying the tongue.

The stopper with its locking members is of a particularly simple design if it has a cover member reaching over the tongue and the free arms, and the cover member reaches with its latching feet into recesses provided in the holding surface.

The clamping fixture according to the present invention can be combined in a very simple manner with a buffer serving as a stop for the rear seat backrest in its upright position, if an elastic buffer is disposed on the side of the cover member facing away from the stopper.

This buffer can be integrated with the stopper to form a unit component by forming the buffer from a screen glued to the cover member and a resilient hollow body molded onto it.

An especially stable shackle can be obtained at a low cost by connecting the two free arms of the shackle above the stopper by means of a cross strut welded to the arms.

Figure 3:
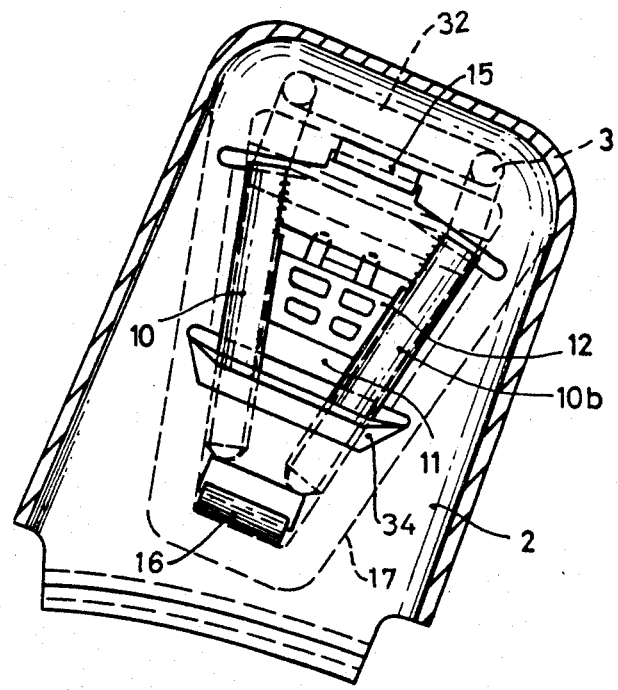
Figure 4:
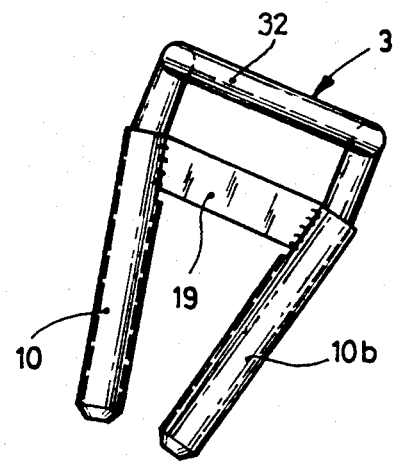

The present invention may have numerous embodiments. One of them is shown in the drawing and will be described below. Here, FIG. 1 shows a perspective rear view of a rear seat backrest region including the immediately adjacent body parts, FIG. 2 shows a longitudinal section through the clamping fixture according to the present invention, FIG. 3 shows a section through the clamping fixture along line 3—3 in FIG. 2, FIG. 4 shows a front view of the shackle of the clamping device according to the present invention, FIG. 5 shows a front view of a pillow block of the clamping fixture according to the present invention, and FIG. 6 shows a section through the pillow block along line 4—4 in FIG. 5.

FIG. 1 shows inside a motor vehicle a partial region of a wheel case 1 to which is welded a clamping fixture 2 designed as a stamped plate part in the form of a pillow block. This clamping device 2 holds a U-shaped shackle 3. A rear seat backrest 4 has on its rear side a recess 5 into which the shackle 3 is able to grip with the rear seat backrest 4 in its upright position. A locking member 7 in the recess 5 which can be seen in FIG. 2 locks the rear seat backrest turned into its upright position with the shackle 3 and can be released by means of an operating knob 6. The shackle 3 (FIG. 4) has two free arms 10 and 10b which converge towards one another. The two free arms 10, 10b are joined to a U-shaped portion of the shackle 32 at an angle of 90° as shown in FIG. 2.

Figure 2:
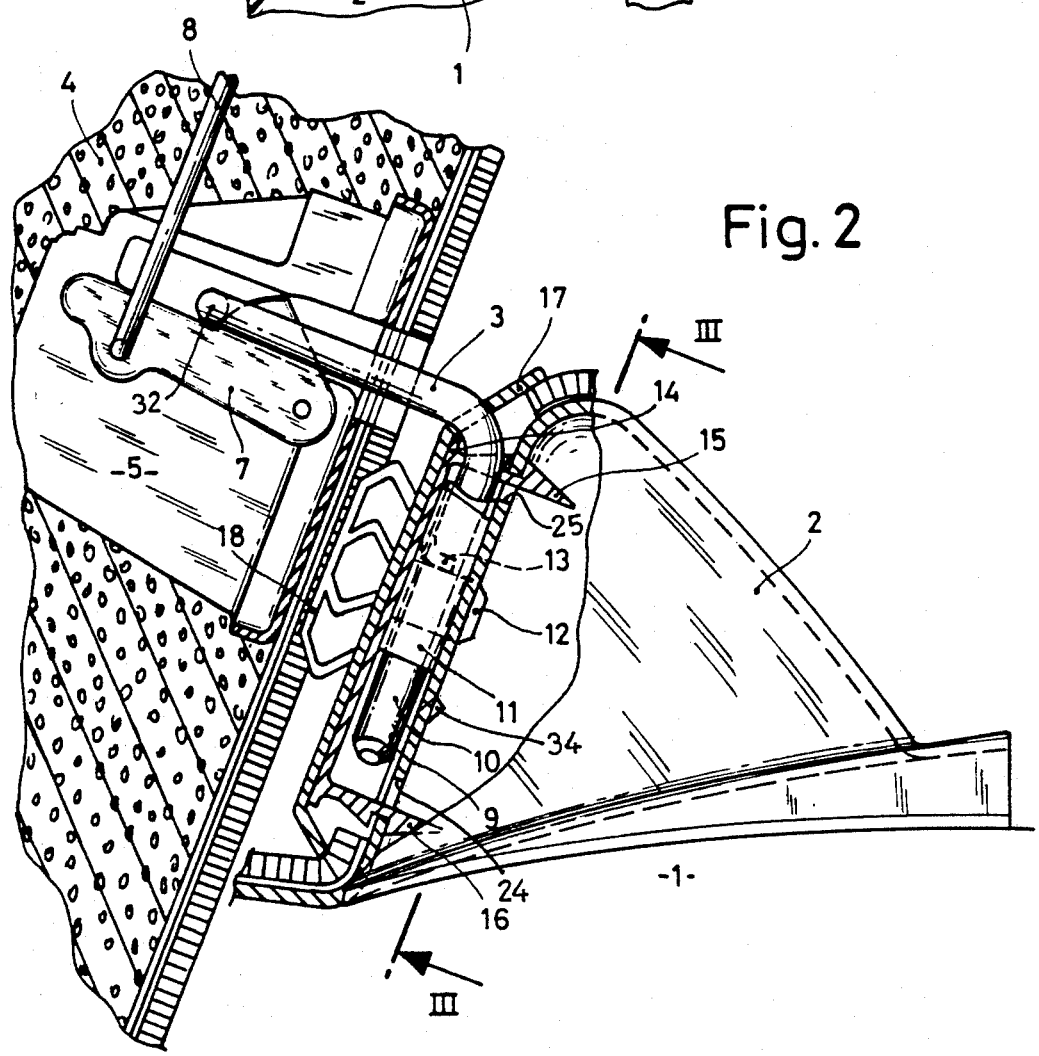

The components essential for the present invention can be more clearly recognized in FIG. 2. The locking member 7, which can be pushed down by means of a bar 8 leading in the upward direction, so that it is disengaged from the shackle 3 U-shaped portion 32 and therefore the rear seat backrest 4 can be turned in the forward direction, as can be seen in the recess 5 of the rear seat backrest 4. The upper region of the wheel case 1, to which the clamping fixture 2 is welded, can be seen behind the rear seat backrest 4. The clamping fixture has a holding surface 9 pointing toward the said rear seat backrest 4. {, against which}A tongue 11 is stamped out of the holding surface 9. The tongue 11 projects from the holding surface 9 towards the rear seat backrest 4. The holding surface has a lower ramp 34 projecting away from the rear seat 4. The holding surface 9 above and below the tongue abuts the shackle 3 {with its} arms 10 and 10b. The arms 10 and 10b are extending in the downward direction, {due to} being bent at right angles from the portion 32. {A}As mentioned previously, the tongue 11, which will be described in even greater detail on the basis of the following Figures, is stamped out of the plane of the holding surface 9 toward the rear seat backrest 4 and secures the shackle 3 in the forward (towards the seat backrest 4) and lateral directions. In the upward direction, the position of the shackle 3 is secured by a stopper 12 which reaches through the tongue 11 from the front and abuts in the upward direction against an offset portion 13 of the tongue 11. The stopper 12 laterally abuts.

The stopper 12 is made in one piece with a cover member 14 which has a latching foot 15, 16 on each of its two opposite sides, the latching foot being latched to the holding surface 9, thereby holding the stopper 12 in the position as shown. A screen 17, which is made in one piece with a buffer 18 from a resilient material and is a resilient hollow body, is glued to the cover member 14. The rear seat backrest 4 in its upright position as shown lies against the buffer 18.

FIG. 3 shows the stopper 12 laterally abuts against the arms 10, 10b of the shackle 3 on the inside. It is also seen that the arms 10, 10b converge toward each other and reach out of the tongue 11 upward and downward. The stopper 12, which consists of a resilient material (typically plastic), is of a trapezoidal shape corresponding to the direction of the arms 10, 10b. The converging arms 10, 10b cause the shackle 3 to be pulled downward by the stopper 12 which is abutting against it on the inside into the tongue 11, as a result of which the shackle is held in the tongue reliably, firmly and without rattle.

The shackle 3 is shown as a single part in FIG. 4. Its converging arms 10, 10b are also seen in this Figure. FIG. 4 also shows that the arms 10, 10b are connected by a strut 19 welded to them.

FIG. 5 shows a view of the holding surface 9 of the clamping fixture 2. In this view, the tongue 11 is stamped out of the holding surface from the viewer's observation plane. Corresponding to the direction of the arms 10, 10b, {it} the tongue 11 has a trapezoidal shape which becomes narrow in this downward direction, so that the arms 10, 10b are able to laterally abut against the lateral surfaces 20, 21 of the tongue 11 on the inside and are able to hold the stopper 12 there. An aperture 23, into which the stopper 12 can be inserted, is provided in the front wall 22 of the tongue 11 in FIG. 5. A window-like recess 24 is provided in the holding surface 9 below the tongue 11. A matching recess 25 is located above the tongue 11. These recesses 24, 25 serve to hold the latching feet 15, 16 of the cover member 14.

FIG. 6 shows an additional illustration of the design of the clamping fixture 2. It is clearly recognized that the tongue 11 projects from the plane of the holding surface 9 of the clamping fixture 2. FIG. 6 also shows the offset portion 13 against which the stopper 12 abuts from the bottom. The offset portion 13 is directed into the aperture perpendicular to the plane of the aperture 23. The contact between the offset portion 13 and the stopper 12 prevents the shackle 3 from being pulled upward.

Additionally, an especially stable shackle 3 can be obtained at low cost by connecting the two arms 10, 10b with a cross strut 19 welded to the arms 10, 10b.

The embodiments of the invention in which an exclusive property or privilege is claimed are defined as follows:

1. Clamping fixtures with an approximately U-shaped shackle in a motor vehicle, in which the shackle is bent at right angles in the plane of the U and its free arms are hold by the clamping fixture, characterized in that the clamping fixture (2) has a tongue (11) which is stamped out of the plane of a holding surface (9) and behind which the shackle (3) is disposed, simultaneously abutting against the holding surface (9) above and blow the tongue (11), and the tongue (11) comprises in its front wall (22) an aperture (23) in which is seated a stopper (12) which abuts laterally against the free arms and which locks the shackle (3) in the tongue (11).

2. Clamping fixture according to claim 1, characterized in that the free arms (10, 10b) of the shackle (3) converge towards each other, the tongue (11) correspondingly narrows towards its lower end.

3. Clamping fixture according to claim 1, characterized in that the stopper (12) is trapezoidal in cross section and made of a resilient plastic.

4. Clamping fixture according to claim 1, characterized in that the aperture (23) is bounded at the top by an offset portion (13) of the tongue (11), which offset portion (13) is directed into the aperture (23) perpendicularly to the plane of the aperture (23).

5. Clamping fixture according to claim 1, characterized in that the stopper (12) is latched in the holding surface (9) which comprises the tongue (11).

6. Clamping fixture according to claim 1, characterized in that the stopper (12) has a cover member (14) which overlaps the tongue (11) and the free arms (10, 10b) and which has latching feet (15, 16) engaging in recesses (24, 25) in the holding surface (9).

7. Clamping fixture according to claim 6, characterized in that on the side of the cover member (14) facing away from the stopper (12) is disposed a resilient buffer (18).

8. Clamping fixture according to claim 7, characterized in that the buffer (18) consists of a screen (17) glued onto the cover member (14), and a resilient hollow body moulded integrally with the screen (17).

9. Clamping fixture according to claim 1, characterized in that the two free arms (10, 10b) of the shackle (3) are joined together above the stopper (12) by means of a transverse strut (19) which is welded to the arms (10, 10b).

* * * * *